O. J. McGANN.
VALVELESS ROTARY INTERNAL COMBUSTION ENGINE.
APPLICATION FILED JAN. 16, 1917.
1,269,722.
Patented June 18, 1918.
4 SHEETS—SHEET 1.
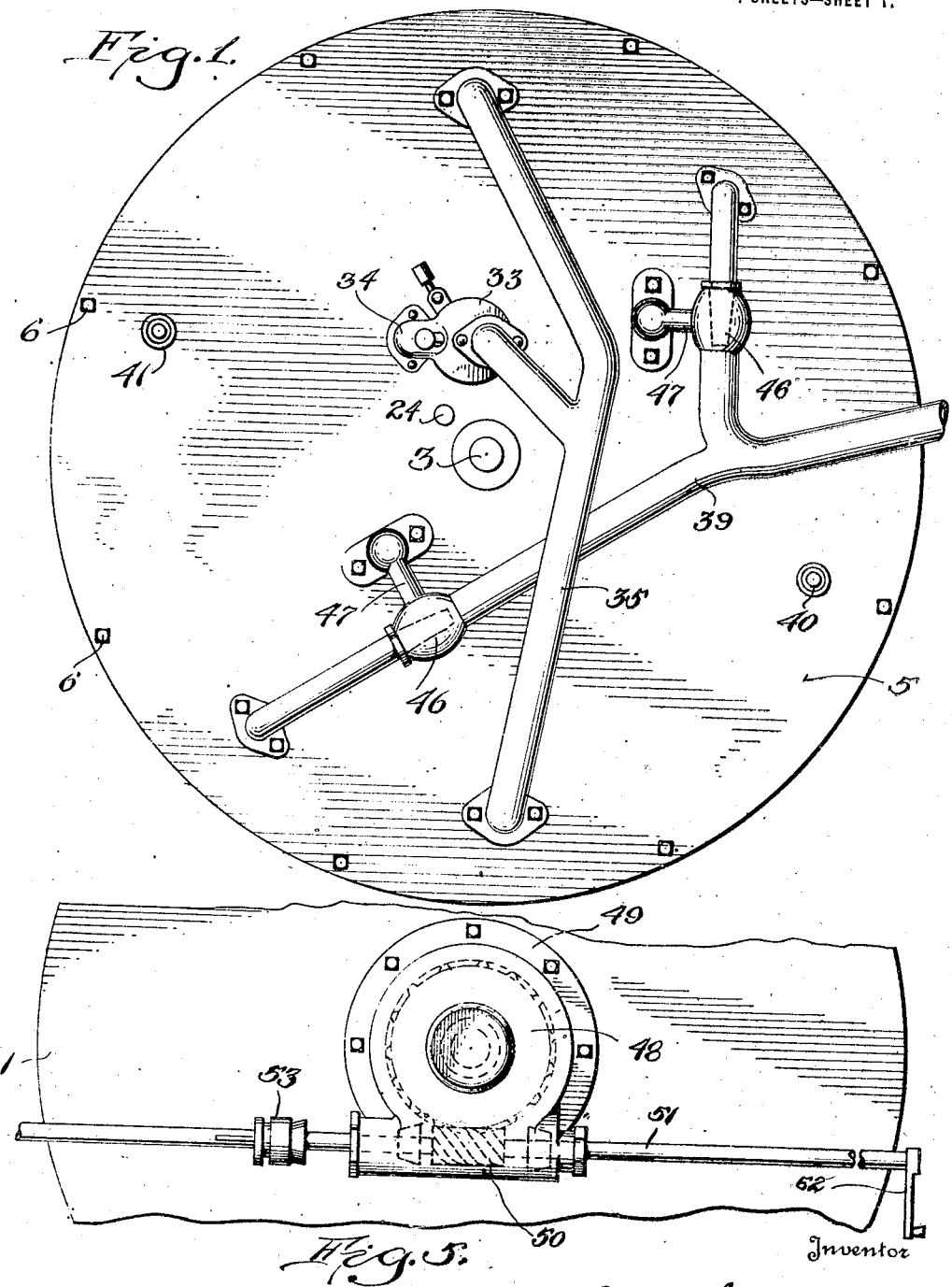

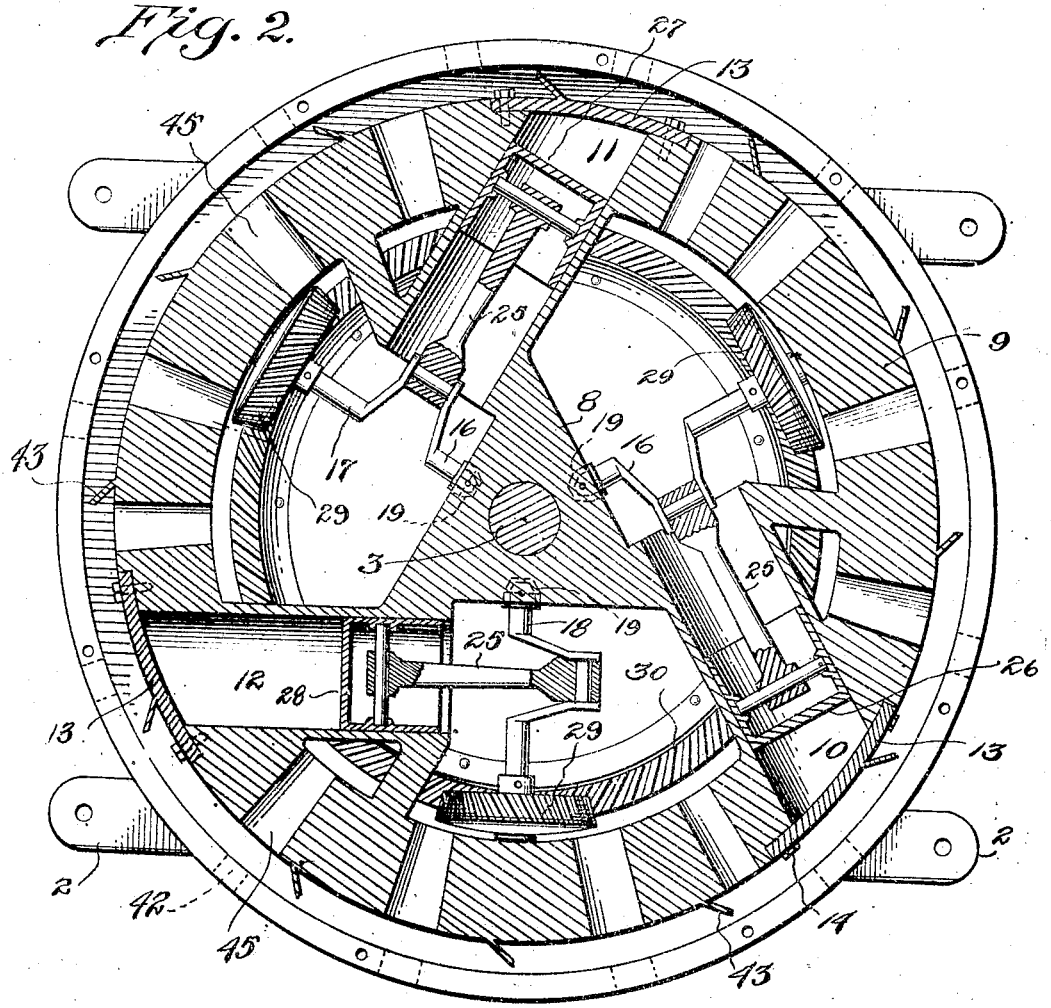
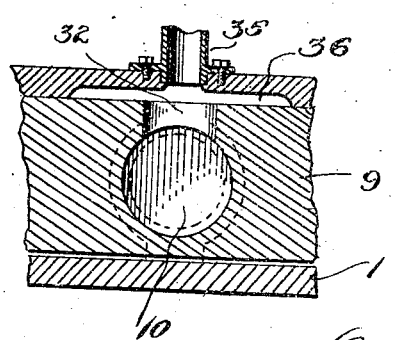

O. J. McGANN.
VALVELESS ROTARY INTERNAL COMBUSTION ENGINE.
APPLICATION FILED JAN. 16, 1917.
1,269,722.
Patented June 18, 1918.
4 SHEETS—SHEET 3.
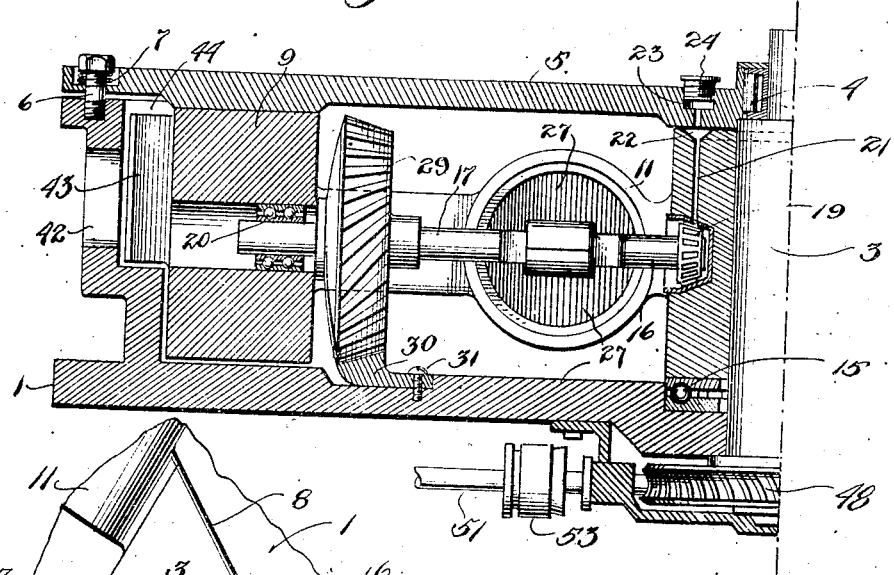
Fig. 3.
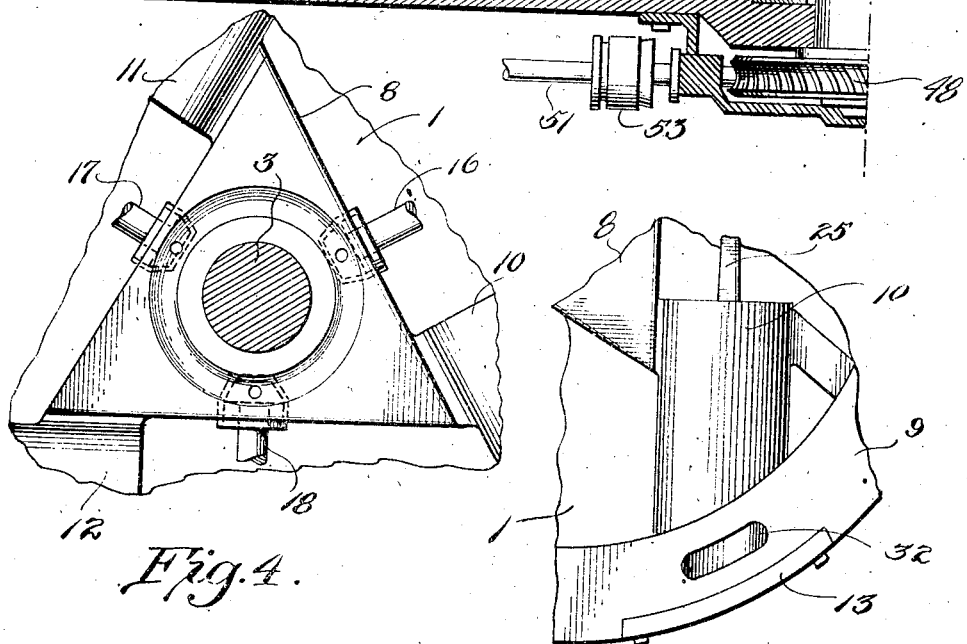
Fig. 4.
Fig. 8.
Inventor
Owen J. McGann.
By Seurin Goldsborough Hull
Attorneys

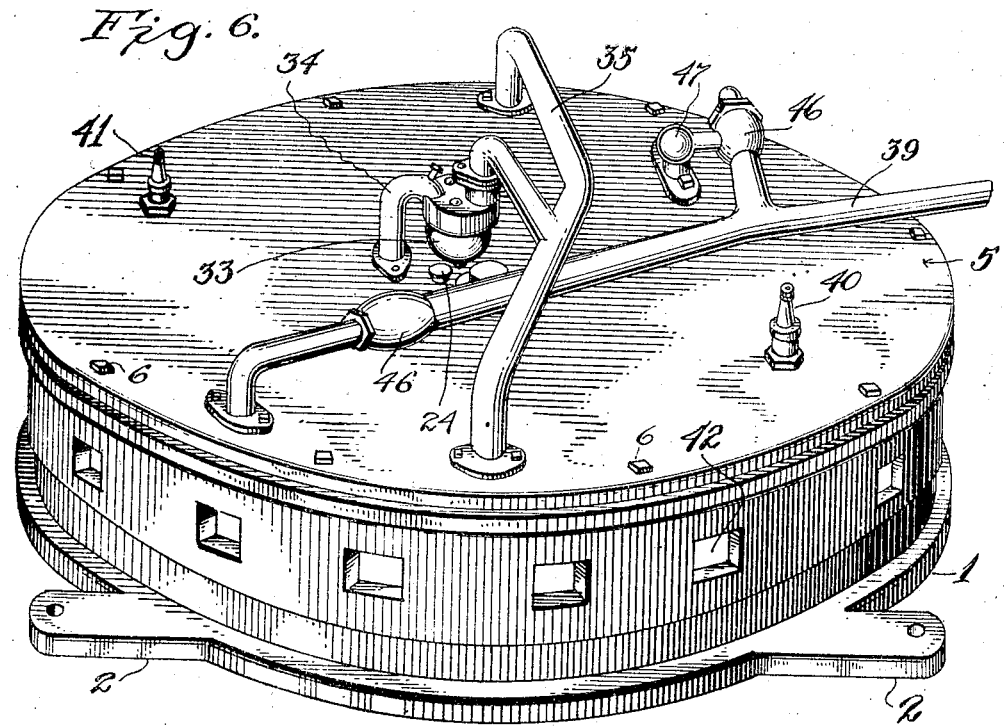
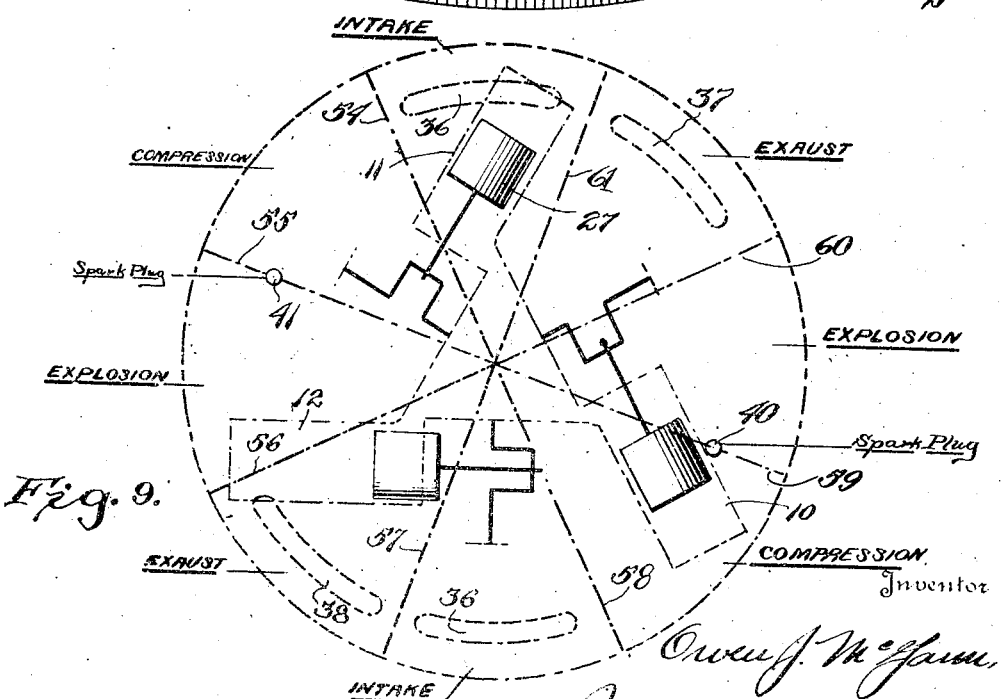

UNITED STATES PATENT OFFICE.

OWEN J. McGANN, OF WATTSVILLE, OHIO, ASSIGNOR OF ONE-HALF TO GEORGE SINCLAIR, OF HANOVERTON, OHIO.

VALVELESS ROTARY INTERNAL-COMBUSTION ENGINE.

1,269,722.  Specification of Letters Patent.  Patented June 18, 1918.

Application filed January 16, 1917. Serial No. 142,665.

*To all whom it may concern:*

Be it known that I, OWEN J. McGANN, a citizen of the United States, residing in the city of Wattsville, in the county of Carroll and State of Ohio, have invented certain new and useful Improvements in Valveless Rotary Internal-Combustion Engines; and I do hereby declare the following to be a full, clear, and exact description of the invention, such as will enable others skilled in the art to which it appertains to make and use the same.

This invention relates to a valveless rotary internal combustion engine wherein the rotary motion is produced by reciprocating pistons.

An object of the invention resides in the provision of an engine of the rotary type wherein the number of impulses during each rotation is equal to twice the number of cylinders.

A further object of the invention resides in so constructing the engine that the power is transmitted to the rotor adjacent to its periphery, and is collected from the rotor adjacent to its axial center.

A further object of the invention resides in so constructing the engine that it will be air-cooled, and so that the circulation of air will be automatically established and maintained and will bear a predetermined ratio to the speed of reciprocation of the pistons.

With these and other objects in view, such as will appear as the description progresses, the invention comprises the combination and arrangement of parts as set forth in and falling within the scope of the appended claims.

In the drawings:—

Figure 1 is a plan view of an engine constructed in accordance with the invention;

Fig. 2 is a horizontal sectional view showing the relative positions of the pistons;

Fig. 3 is an enlarged vertical sectional view;

Fig. 4 is an enlarged detail showing the manner in which the crank bearings are lubricated;

Fig. 5 is an enlarged fragmental bottom plan view;

Fig. 6 is a perspective view of the entire device;

Fig. 7 is an enlarged fragmental sectional view illustrating the relation of the cylinders and their ports;

Fig. 8 is a fragmental elevation illustrating the relation of the cylinders and their ports; and Fig. 9 is a diagrammatic view.

Referring to the drawings, one embodiment of the invention is illustrated, which includes a casing 1 having suitable elements 2 thereon by means of which it may be attached to the chassis of the vehicle, or any other suitable support. Mounted within the casing 1 is a vertical shaft 3 which is provided at its upper end with a roller bearing 4 and which extends through the casing at its lower end, being supported by a ball bearing, as will later appear. The roller bearing 4 operates against the cover 5 of the casing, which cover is secured yieldingly in place on the casing by bolts 6, which are encircled by springs 7, the bolts passing freely through the cover 5 and being attached to the casing 1, and the springs being interposed between the heads of the bolts and the cover 5.

In order that this vertical shaft 3 may be rotated so that the power may be taken therefrom, a rotor is provided. This rotor comprises a central body portion 8, which is secured to the vertical shaft 3 and an annulus 9 which is formed integral with the body portion and is concentric with the peripheral face of the casing 1. This rotor is provided, in the embodiment illustrated in the drawings, with three explosion cylinders 10, 11 and 12, which are formed by boring through the annulus 9 and the body portion 8 in tangential directions. The outer ends of the cylinders are closed at the peripheral face of the annulus by suitable heads 13, which are secured in place by tap bolts 14. This rotor is supported by ball bearings 15 which are interposed between the lower end of the body portion and the casing 1, which ball bearings, because of the fact that the said body portion is secured to the shaft 3, likewise support the shaft. Crank shafts 16, 17 and 18 extend between the annulus 9 and the body portion 8 of the rotor and are arranged one hundred and twenty degrees apart. The inner ends of these shafts are supported by roller bearings 19, while the outer ends are supported in the annulus 9 by ball bearings 20. The roller bearings 19 are oiled through ducts 21, which extend to the bearings through the body portion 8 from an annular groove 22, which is formed in the top of the body portion, and which is itself supplied with oil through a suitable opening 23 which is normally closed by a cap 24. To the crank portion of each of these shafts 17 is connected the connecting rod 25, which is, at its other end, connected to the adjacent piston 26, 27 or 28, which pistons are operable in the afore-mentioned cylinders. A suitable gear 29 is secured to each of these crank shafts and operates upon a stationary rack 30, which rack is secured, by suitable means 31, to the casing 1 and is concentric with the vertical shaft 3.

In order that an explosive mixture may be fed successively to the cylinders, exploded therein and subsequently exhausted therefrom, each of the cylinders is provided with an elongated port 32 which is formed in the annulus 9 and extends vertically therethrough into the cylinder. Through this port, the explosive mixture is sucked and also expelled. Arranged on the upper face of the cover 5 of the casing is a carbureter 33, which is supplied with suitable fuel and which obtains its air through a conduit 34 which communicates with the interior of the casing 1. The intake manifold 35 extends from the carbureter to diametrically opposite points on the casing, where it terminates in elongated ports 36, which ports are formed in the under face of the cover 5, are arcuate and are concentric with the ports 32, so that during movement of the rotor, the latter ports will pass beneath the former and the communication between the ports will exist for a sufficient length of time to permit the explosive mixture to be sucked into and fill the cylinders. This period of communication between the ports is equal in length to the time consumed by a piston in making its intake stroke.

The cover 5 of the casing is provided with a second pair of elongated and similarly concentric ports 37 and 38 which are adapted to register successively with the ports 32 in the annulus 9 during the rotation of the rotor and are connected to the exhaust manifold 39, which is located on the top of the cover 5.

Suitable spark producing devices 40 and 41 extend through the cover 5 of the casing and are arranged at diametrically opposite points, which are removed from the center of the casing to such an extent that during rotation of the rotor, the ports 32 therein will pass beneath the same, so that the spark produced thereby will be effective to explode the mixture in the cylinders.

In order that the engine may be cooled, a plurality of orifices 42 are provided in the casing 1 through which air is drawn by fan-like elements 43 carried by the periphery of the annulus 9 and operating in a chamber 44 in the annular wall of the casing 1. Extending through the annulus 9, between each pair of elements 43, are orifices 45 through which the air is adapted to pass to the interior of the rotor, so that by circulating about the cylinders, it will be effective in cooling the same. A circulation of air through the casing is maintained by suitable siphon-heads 46 which are located in the exhaust manifolds 39 and communicate with the interior of the casing through pipes 47. It will be obvious that the suction produced by the passage of the exhaust gases through the manifold 39 will be effective to exhaust the air from the casing.

Secured to the lower end of the vertical shaft 3 is a worm gear 48 which is inclosed in a suitable casing 49 and with which a worm 50 intermeshes. This worm 50 is secured to a shaft 51, on one end of which a crank handle 52 is secured and which is provided with a clutch 53. Thus when the clutch 53 is operative, power may be taken through the shaft 51, or when it is rendered inoperative, the engine may be started by means of the crank 52 through the shaft 51.

It will be seen from the foregoing description that as the rotor operates, the ports 32 leading to the cylinders will be successively brought beneath the intake and exhaust ports in the cover 5, and also beneath the spark-producing devices 40 and 41, so that the engine will have the cycle of operations which will later be described in connection with Fig. 9. The movement of the pistons in their respective cylinders will, through the crank shafts 16, 17 and 18, cause the rotation of the gears 29, and since the rack 30 is stationary and the rotor which carries the gears is movable, the said rotor will be given a movement within the casing 1. It is to be noted that the pistons do not operate directly upon the vertical shaft 3, but tangentially thereto and at points considerably removed from the shaft.

Referring particularly to Fig. 9 of the drawings, it will be noted that as the rotor passes the upper intake port 36, the piston 27 in the cylinder 11 is on its intake or suction stroke. By the time the piston has completed this stroke, the rotor has moved so that the cylinder 11 passes to the point 54. During the travel of the cylinder 11 from the point 54 to the point 55, the piston 27 is on its compression stroke, and immediately upon the cylinder reaching this point 55, which is in radial alinement with the spark-producing device 41, the charge in the cylinder is fired, whereupon the piston is caused, as the cylinder passes from the point 55 to the point 56 to perform its explosion or power stroke. Upon the completion of this stroke and the passage of the cylinder beyond the point 56, the piston commences its exhaust stroke and continues this stroke until the point 57 is reached, the cylinder being at this time in communication with the exhaust port 38. This same cycle of operations is repeated in connection with this same cylinder, the explosive mixture being taken in through the lower intake port from the point 57 to the point 58, being compressed from the point 58 to the point 59, expanded from the point 59 to the point 60, and exhausted from the point 60 to the point 61. Of course, it is to be understood that as one of the cylinders is taking in gas, the gas is being exhausted from another and is expanding in the third, so that upon each revolution of the rotor, the gas in each of the cylinders will be exploded twice and will thus give two impulses to the rotor, which, when the number of cylinders is equal to three, will amount to six impulses during a single revolution of the rotor, or when the number of cylinders is equal to five will amount to ten impulses during a single revolution of the rotor.

In view of the fact that the pistons rotate with the rotor and that the elements which connect the pistons to the rack on the casing to cause the actuation of the rotor, also move with the rotor it is necessary to have the speed of the elements which is independent of their movement with the rotor, bear a predetermined relation to the speed of the rotor. I have found that where the pistons operate on the four-stroke cycle it is necessary to have the gears 29 bear such a relation to the rack 30 as one is to four. This relation insures the proper timing.

What I claim is:—

1. In an internal combustion engine, the combination with a casing, of a shaft rotatably mounted therein, a rotor secured to the shaft, cylinders carried by the rotor and extending tangentially with respect to the shaft, pistons operable in the cylinders, crank shafts extending at right angles to the first mentioned shaft and mounted in the rotor, piston rods connecting the crank shafts to the pistons, and gearing between the crank shafts and the casing to cause the rotation of the rotor upon the rotation of the crank shafts.

2. In an internal combustion engine, the combination with a casing, of a shaft rotatably mounted therein, a rotor secured to the shaft, cylinders carried by the rotor and extending tangentially with respect to the shaft, pistons operable in the cylinders, radially extending crank shafts extending at right angles to the first mentioned shaft and mounted in the rotor, piston rods connecting the crank shafts to the pistons, and gearing between the crank shafts and the casing to cause the rotation of the rotor upon the rotation of the crank shafts.

3. In an internal combustion engine, the combination with a casing, and a shaft rotatably mounted therein, a rotor secured to the shaft and extending tangentially with respect to the shaft, cylinders carried by the rotor, pistons operable therein, crank shafts mounted in the rotor and extending at right angles to the first mentioned shaft, a rack secured to the casing, and gears secured to the crank shafts and intermeshing with the rack, whereby the rotor and shaft will be actuated upon the operation of the pistons.

4. In an internal combustion engine, the combination with a casing, of a rotor operable therein, cylinders carried by the rotor, pistons operable in the cylinders, a shaft secured to the rotor, gearing between the pistons and casing to cause the rotation of the rotor upon the operation of the pistons, means for forcing air into the casing to cool the cylinders, and means for drawing air from the casing.

5. In an internal combustion engine, the combination with a casing, of a rotor operable therein, cylinders carried by the rotor, pistons operable in the cylinders, a shaft secured to the rotor, gearing between the pistons and casing to cause the rotation of the rotor upon the operation of the pistons, means for forcing air into the casing to cool the cylinders, and means operated by the exhaust to draw the air from the casing.

6. In an internal combustion engine, the combination with a casing, of a rotor operable therein, cylinders carried by the rotor, pistons operable in the cylinders, a shaft secured to the rotor, gearing between the pistons and casing to cause the rotation of the rotor upon the operation of the pistons, means for forcing air into the casing to cool the cylinders, and pipes connected to the casing and to the exhaust manifold to draw the air from the casing.

In testimony whereof I affix my signature.

OWEN J. McGANN.